Aug. 6, 1968  R. J. DODSON  3,395,614
INSIDE BEAD TRIMMING APPARATUS
Filed Oct. 19, 1965
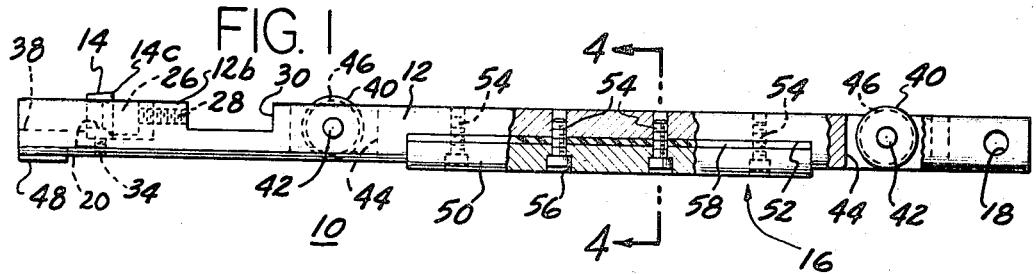
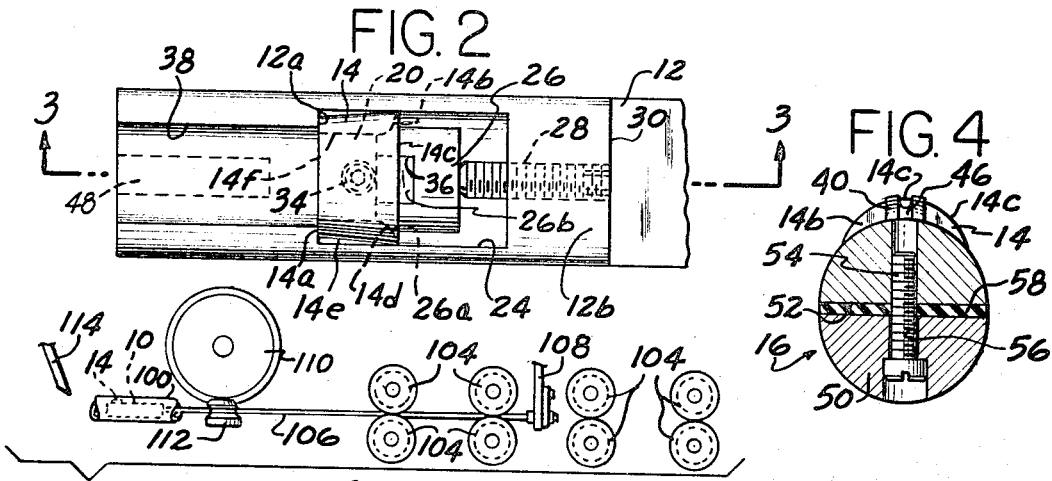
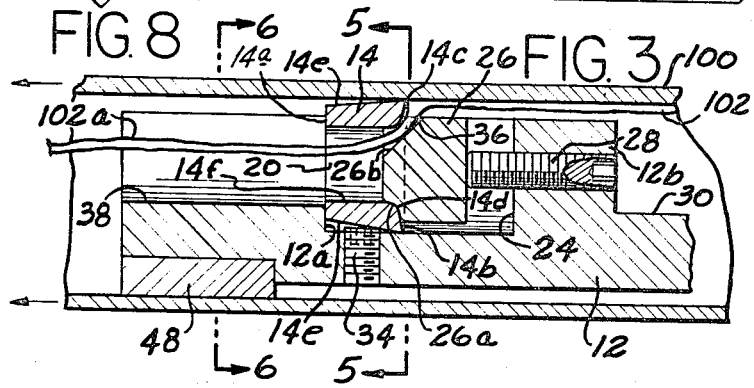
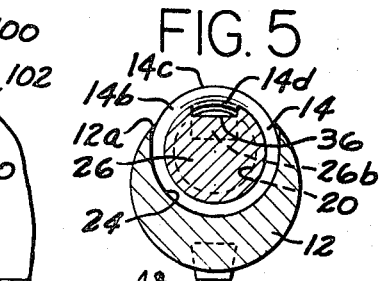
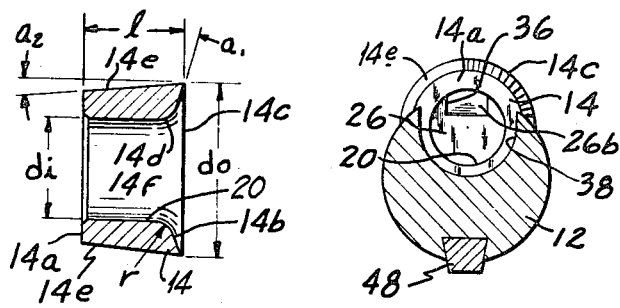
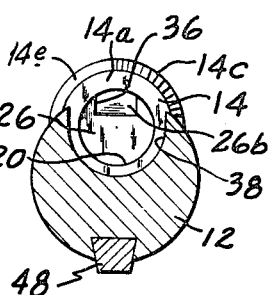
INVENTOR.
RICHARD J. DODSON
BY Mason, Kolehmainen,
Rathburn & Wyss.
ATTORNEYS

# United States Patent Office 3,395,614
Patented Aug. 6, 1968

3,395,614
INSIDE BEAD TRIMMING APPARATUS
Richard J. Dodson, Evanston, Ill., assignor to Clayton Mark & Company, Evanston, Ill., a corporation of Delaware
Filed Oct. 19, 1965, Ser. No. 497,927
8 Claims. (Cl. 90—24)

ABSTRACT OF THE DISCLOSURE

An inside bead trimming tool includes a hollow cylindrical cutting tool having a cutting edge on its forward end. The tool is supported within a recess in the arbor with its axis parallel to the axis of the arbor and with a portion of the cutting edge engagable with the inside bead. The tool is held in place by a clamp engaging the forward end of the tool, and including a recess for guiding severed bead through the hollow tool. A pair of guide wheels engage the tubing wall and span the bead to hold the tool and bead in alignment. The rollers are mounted adjacent opposite ends of a tension pad which slides along the wall of the tubing opposite the head, and a sheet of resilient material sandwiched between the tension pad and the arbor resiliently forces the guide wheels and the cutting tool toward the bead.

---

The present invention relates to the manufacture of welded tubing and more particularly to apparatus and to a method for trimming the inside bead from welded tubing.

When tubing is formed by welding together opposite edges of a formed elongated sheet of material, the resulting welding bead formed along the welded edges or seam, and particularly the bead formed on the inside of the tubing, is generally removed for various reasons. Devices and methods used in the past for removing the inside bead from welded tubing have been unsatisfactory for a variety of reasons, the principal reason being the failure cleanly to remove the bead and the failure to prevent the severed bead from fouling the bead removing equipment. Furthermore, devices used in the past have not been capable of use with small sized tubing having a diameter of less than ¾ inch.

Accordingly, it is a principal object of the present invention to provide inside bead removing apparatus capable of cleanly removing an inside welding bead.

It is another object to provide bead removing apparatus suitable for use on tubing of small size.

It is yet another object of the invention to provide an improved method for trimming an inside welding bead from welded tubing.

Another object of the invention is to provide inside bead trimming apparatus in which the severed bead does not become fouled during the trimming operation.

It is a further object of the present invention to provide inside bead trimming apparatus with which the inside bead may be severed and removed from the tubing in one unbroken piece.

Yet another object of the invention is to provide inside bead trimming apparatus capable of neatly removing both single and double beads formed by either AC or DC welding.

Another object is to provide an improved inside bead cutting tool of the type used with an arbor for removing the inside bead from welded tubing.

Still another object of the present invention is to provide improved inside bead trimming apparatus of the type including a cutting tool having a circular cutting edge, any desired segment of which can be easily and conveniently positioned for severing the inside bead.

Yet a further object of the present invention is to provide inside bead trimming apparatus with which the depth of cut may be easily adjusted.

A still further object of the present invention is to provide inside bead trimming apparatus including a novel compact arrangement for resiliently maintaining the cutting tool in engagement with the inside bead.

It is yet another object of the invention to provide an improved method for inside bead trimming whereby the bead may be neatly and cleanly removed without breakage of the bead and without possibility of the bead fouling the bead removing apparatus.

Briefly, inside bead trimming apparatus constructed in accordance with the present invention comprises an elongated arbor member adapted to be axially received within a welded tubing moved over the arbor. An annular cutting tool having a circular cutting edge on the forward outer rim thereof is supported partially within a recess in the arbor by means of a clamp whereby any desired segment of the cutting edge may be used for severing the inside bead. The annular cutting tool has an axially disposed central discharge opening, and when the bead is severed it is guided downwardly and rearwardly with respect to the arbor by means of guiding surfaces on the cutting tool and on the clamp, and is fed through the central opening. The arbor includes a passageway extending rearwardly from the central opening of the cutting tool so that the severed bead may travel through the cutting tool and out the rear of the arbor in a region spaced from the tubing wall, without being forced to travel away from the seam across the entire diameter of the tubing. Thus, the severed bead cannot become fouled between the arbor and tubing wall, and the strain to which the severed bead is subjected is materially reduced as compared with apparatus of the prior art, and the severed bead may be cleanly removed as a unitary piece without breaking or fouling the cutting tool. Furthermore, convenient means are provided for adjusting the position of the cutting tool and thereby regulating depth of cut.

The arbor member additionally supports a tension pad bearing against the tubing wall opposite the welded seam for forcing the cutting tool into bead-severing engagement with the inside bead. In accordance with a feature of the invention, the tension pad and the body of the arbor are resiliently urged apart by means of a sheet or layer of elastomeric material.

In brief, the method of the present invention comprises the steps of severing the inside bead from the tubing wall, guiding the severed bead downwardly and rearwardly away from the wall toward for a distance substantially less than the diameter of the tubing to a region spaced from the tubing wall, and then guiding the severed bead rearwardly along a line generally parallel to and spaced from the tubing wall.

Other objects and advantages of the present invention will become apparent from the ensuing description of an illustrative embodiment, in the course of which reference is had to the accompanying drawing, in which:

FIG. 1 is a side elevational view, partly in section, of inside bead trimming apparatus constructed in accordance with the present invention;

FIG. 2 is an enlarged fragmentary top view of the rear or following end of the apparatus of FIG. 1;

FIG. 3 is a sectional view taken along the line 3—3 of FIG. 2, in which a portion of the welded tubing is illustrated;

FIG. 4 is an enlarged sectional view taken on the line 4—4 of FIG. 1 and illustrating the tensioning means of the inside bead trimming apparatus;

FIG. 5 is a sectional view taken along the line 5—5 of FIG. 3;

FIG. 6 is a sectional view taken along the line 6—6 of FIG. 3;

FIG. 7 is an enlarged sectional view of the annular cutting tool illustrating various dimensions referred to in the specification; and FIG. 8 is a diagrammatic illustration of tube forming apparatus including the inside bead trimming apparatus of FIG. 1.

Referring now to the drawing and initially to FIG. 1, there is illustrated inside bead trimming apparatus generally indicated by the numeral 10 and constructed in accordance with the present invention. The apparatus 10 includes an arbor 12 insertable axially within welded tubing 100 moved relative to the arbor in a right-to-left direction as viewed in FIGS. 1–3.

In order to trim an inside welding bead 102 from the welded tube 100, a cutting tool 14 is supported by the arbor and, as will appear hereinafter, the novel manner of mounting and shape of the cutting tool 14, as well as the novel structure of the arbor 12, permit the severed bead 102a (FIG. 3) cleanly to be removed from the tubing wall and to be discharged from the apparatus 10.

The arbor 12 additionally supports novel tensioning means generally designated as 16 for maintaining the cutting tool 14 in engagement with the inside bead 102.

The arbor 12 is generally in the form of an elongated cylinder and is circular in cross section throughout substantial portions of its length. The forward or leading end of the arbor 12 (the right hand end as viewed in FIG. 1) is provided with suitable connecting means such as an opening 18 whereby the apparatus 10 may be supported within the welded tubing while the tubing is moved relative to the apparatus 10. It will be understood that the diameter of the arbor 12 is somewhat smaller than the inside diameter of the tubing so that the apparatus 10 may conveniently be positioned within the tubing. The arbor 12 is preferably formed of a suitable strong rigid material such as hardened steel.

The cutting tool 14 is generally cylindrical in shape and is provided with an axial discharge opening 20 defined by a right cylindrical inside wall 14f. The rear of the tool comprises an annular flat wall 14a adapted to lie in a plane normal to the axis of the tubing, and the forward end of the cutting tool comprises an inwardly and rearwardly extending truncated cone shaped surface 14b defining a continuous circular cutting edge 14c at the forward outer rim of the cutting tool. A rounded surface 14d joins the inwardly and rearwardly extending surface 14b to the inside wall 14f of the cutting tool. The entire cutting tool or at least the portion thereof near the cutting edge 14c may be formed of a hard substance such as a suitable cemented carbide material, or alternatively, as discussed hereinafter, of a hard ceramic material, whereby the cutting tool is capable of severing the inside welding bead 102 from the welded tubing 100. It should be understood that the use of a cutting tool with a continuous circular cutting edge allows various segments of the cutting edge to be used when other segments become dulled, thus extending the life of the cutting tool 14. The outer surface 14e of the cutting tool 14 is relieved slightly inwardly from the cutting edge 14c in order to reduce friction between the tool and the tubing, and in order to provide a sharper edge.

In order that the cutting tool 14 may be mounted partly within the body of the arbor 12, the arbor 12 is provided with a recess 24 near the rearward or following end thereof. As can best be seen in FIGS. 3 and 5, the lower portion of the recess 24 is similar in shape to the largest diameter portion of the cutting tool 14 while the sides of the recess extend vertically to the top of the arbor 12. Thus, in cross section, the recess 24 is U-shaped (FIG. 5), and the cutting tool 14 may be inserted from above into the recess 24. The arbor 12 includes a flat wall 12a defining the rearward end of the recess 24 against which the flat wall 14a of the cutting tool is held when the tool is mounted in the arbor.

In order to hold the cutting tool 14 in place in the recess 24, a clamp member 26 is tightened against the forward end of the cutting tool 14 by means of a screw 28 threaded through a portion 12b of the arbor 12 positioned between the recess 24 and another recess 30, the screw 28 being adjustable from the recess 30 for clamping and unclamping the cutting tool 14. The front end of the clamp member 26 is provided with an annular concave curved surface 26a (FIGS. 2 and 3) complementary to and engageable with the rounded surface 14d at the front of the cutting tool 14 for firmly holding the cutting tool 14 in place against the flat wall 12a of the arbor upon tightening the screw 28.

As clearly appears in FIGS. 3–5, the cutting tool 14, when installed in the arbor 12, projects a distance above the top of the arbor 12 whereby a segment of the cutting edge 14c is effective to engage and sever the inside bead 102. In order to adjust the vertical position of the cutting tool 14, and thereby adjust the depth of cut of the tool 14 into the inside bead 102, a threaded adjustment screw 34 is threaded into the wall of the arbor 12 located beneath the recess 24 and engages and forms a lower stop for the cutting tool 14. The threaded screw 34 is adjustable from the top—i.e., from within the recess 24. Thus, it can be understood that adjustment of the screw 34 and subsequent tightening of the clamp 26 may conveniently be accomplished from the top of the arbor 12 in order to position the tool 14.

The bead removing apparatus 10 comprises one device with which the novel method of the present invention may be practiced. Thus, as the welded tubing 100 and the inside bead trimming apparatus 10 are moved axially relative to one another, the cutting tool 14 engages and severs the bead 102, the severed portion of the bead being designated as 102a (FIG. 3). In order cleanly and smoothly to remove the bead from the welded tubing, to prevent the bead from fouling the apparatus 10, and to sever the entire inside bead in one piece for easy removal thereof, and in accordance with a feature of the present invention, the severed bead 102a is guided downwardly and rearwardly away from the welded seam of the tubing and is then guided rearwardly in an axial direction with respect to the arbor 12 along a path through the arbor itself and spaced from the tubing wall. Since the severed portion 102a is not forced across the entire diameter of the tubing to the tubing wall opposite the welding seam and forced along a small passage between the arbor and the tubing wall as in devices used in the past, the bead may be removed in one piece and passed cleanly through the apparatus 10.

The inwardly and rearwardly extending surface 14b of the cutting tool 14 serves to guide the severed bead downwardly from the cutting edge 14c and away from the wall of the tubing and toward the clamp 26. In order to allow passage of the severed bead 102a through the clamp and, additionally, in order to direct the severed bead 32a in a rearward axial direction, the clamp 26 is provided with a recess 36 located directly beneath the welded seam of the tubing and defined in part by an inclined surface 26b of the clamp 26. Thus the downwardly and rearwardly moving bead is directed against the inclined surface 26b of the clamp 26 and its direction is changed so that the severed bead 102a moves around the rounded surface 14d of the cutting tool 14 and moves axially rearward through the central opening 20 of the cutting tool 14.

In order to allow the severed bead 102a freely to travel rearwardly from the opening 20, the arbor 12 is provided with a recess 38 lying directly behind the recess 26. The recess 38 may be of any suitable shape and size in order to define a rearwardly extending generally axial passageway to the end of the arbor from the opening 20. As illustrated, the recess 38 is somewhat similar to the recess 24, being smaller in size in order to provide for the flat wall 12a for supporting the cutting tool 14 at the rear of the recess 24.

Since the cutting tool 14 is positioned coaxially with the tubing, the cutting edge 14c is firmly supported by the body of the tool 14. The forces exerted on the tool 14 during trimming do not tend to chip the cutting edge or break the tool, but rather are transmitted to the arbor 12. The angle of inclination of the outer wall 14e of the tool 14 is fairly small, so that the body of the tool firmly supports the cutting edge.

Having reference to FIG. 7, various dimensions of the cutting tool are illustrated. The following comments and numerical values relating to these dimensions are intended to be illustrative only, and should not be taken to limit the scope of the present invention as defined in the claims.

The maximum outer diameter of the tool 14, designated $d_o$, may conveniently be about half of the inside diameter of the welded tubing, while the inside diameter $d_i$ and the length $l$ of the tubing may be about half the outside diameter, or somewhat greater. It has been found that trimming can effectively be accomplished if the angle $a_1$ between the plane of the cutting edge 14c and the surface 14b is approximately 20°, and the angle $a_2$ between the tubing wall and the outer surface 14e is about 6°. The radius of curvature $r$ of the surface 14d may be of any desired length, such as less than half of the inside diameter, $d_i$.

In embodiments of the tool designed in accordance with the present invention, the dimensions indicated by the following table were employed:

| Tubing size | 1⅛″ | ⅝″ | ½″ |
|---|---|---|---|
| $d_o$, inch | .600 | .325 | .250 |
| $d_i$, inch | .312 | .187 | .125 |
| $l$, inch | .312 | .187 | .156 |
| $r_1$, inch | .131 | .037 | .050 |
| $a_1$, degrees | 20 | 20 | 20 |
| $a_2$, degrees | 6 | 6 | 6 |

Testing of a device constructed in accordance with the invention for ⅝″ tubing demonstrated that the inside bead is cleanly removed without fouling or jamming, and is removed in one piece. It is believed that the apparatus of the invention can also successfully be used with smaller ½″ tubing.

Due to the novel construction of the cutting tool 14, its positioning in the arbor 12 with the cutting tool axis parallel to the tubing axis, and the novel construction of the arbor 12 including the recess 38, it can be seen that the severed bead 102a is guided through and out of the apparatus in such a manner that it is not greatly stressed and is not broken during the trimming operation. Furthermore, the bead is not forced to travel between the arbor and the tubing wall. Thus the severed bead 102a is prevented from becoming clogged or fouled in the apparatus 10. The severed bead may be removed in one piece from the tubing and the device of the present invention is capable of removing either single or double beads from tubing welded either by AC or DC welding. When the tubing has been trimmed, the severed bead removed therefrom has been found to be compressed in length—for example, the severed bead trimmed from a twenty-foot length of tubing assumes a length of approximately five feet.

In order to position the apparatus 10 within the tubing in the bead severing position with the cutting tool 14 in alignment with the inside bead 102, the arbor includes a pair of spaced supporting and guiding rollers 40. The rollers are supported for rotation on a pair of pins 42 and are positioned in spaced recesses 44 in the arbor. The outer circumferences of the rollers 40 are provided with recesses 46 adapted to span and ride along the inside bead 102 to maintain the inside bead in alignment with the cutting tool 14. To further support the arbor 12, a heel member 48 is carried within a recess in the arbor at the bottom of the trailing end.

In order to hold the rollers 40 and the cutting tool 14 in engagement with the inside bead 102, the tensioning means 16 includes a tension pad 50 illustrated in FIGS. 1 and 4 and fitting into a cooperating recess 52 in the arbor 12. The tension pad 50 is semicircular in cross section, the rounded portion serving to bear against the tubing wall opposite the welded seam. The pad 50 is held in position beneath the arbor 12 by means of several mounting screws 54 passing through openings 56 in the tension pad 50 and threaded into the body of the arbor 12. The enlarged heads of the screws 54 are slidably countersunk in enlarged portions of the openings 56 in order to limit the maximum downward movement of the tension pad.

In accordance with a feature of the invention, and in order resiliently to force the rollers 40 and the cutting tool 14 upwardly against the welding seam, resilient means comprising a sheet or pad 58 of elastomeric material is held between the top of the tension pad 50 and the arbor 12. Thus, desirable resilient tensioning action is provided with a very simple and convenient structure taking up a minimum of space as compared with prior devices using metal springs and the like. Furthermore, the tension is applied in a uniform fashion over a considerable length of the underside of the arbor.

FIG. 8 diagrammatically illustrates tube forming apparatus with which the inside bead trimming apparatus 10 of the present invention may be used. The tube 100 (only a small segment of which is shown in FIG. 8) is continuously formed from an elongated sheet of material which is fed through several forming rolls 104 and is shaped into a tubular form. The final sets of shaping rolls close the tube 100 around an elongated holder 106 fastened to a stationary support 108. The tube 100 is welded by an electrode 110 and pressure rolls 112, and then passes over the inside bead trimming apparatus 10 supported within the tube 100 by the holder 106 so that the annular cutting tool 14 engages and removes the inside bead. The bead on the outside of the tube is removed by a conventional trimming tool 114.

As mentioned previously, and in accordance with a feature of the invention, the cutting tool 14 may be formed of a hard ceramic material, rather than the conventional cemented carbide. Experimentation with a device constructed in accordance with the invention and using a ceramic cutting tool has indicated that the ceramic tool is able to cleanly sever the welding bead, and to reduce fouling of the bead in the tube.

More specifically, it has been found that the ceramic tool produces a clean even cut. With a carbide tool, there is some tendency for the metal being severed to adhere or become welded to the tool. Eventually this causes the cutting edge to become rough and less able to cut cleanly. With the ceramic tool, there is no tendency for the metal to adhere to the tool and this problem does not arise.

Another advantageous feature of the ceramic tool is that it produces a soft and ductile severed bead 102a, or chip. A metal tool produces a harder, more brittle chip which has a greater tendency to break and become fouled in the tube, or in the bead trimming apparatus 10.

While the present invention has been described in connection with details of a specific embodiment thereof, it should be undertsood that such details are not intended to be limitative of the invention except insofar as set forth in the claims.

What is claimed as new and desired to be secured by Letters Patent of the United States is:

1. Apparatus for trimming an inside bead from the seam of welded tubing, said apparatus comprising an arbor, guiding means mounted on said arbor and engageable with the wall of tubing moved axially with respect to said arbor for positioning a portion of the arbor in alignment with and spaced from the seam, means defining a recess in said portion of the arbor, an annular cutting tool having a circular cutting edge, means for holding said cutting tool in said recess with the cutting tool axis substantially parallel to the tubing axis and with a desired segment of said cutting edge projecting outwardly a distance from said arbor for engaging and severing the inside bead, said holding means comprising clamping means engaging the front and rear ends of said cutting tool, and adjustment means mounted in said arbor and engaging said cutting tool for adjusting said distance of outward projection.

2. Apparatus for trimming an inside bead from welded tubing, said apparatus comprising arbor means, cutting means including a generally cylindrical body having an axial discharge opening through its center, the forward end of said body including an inwardly and rearwardly extending surface forming a circular cutting edge at the outer rim of said forward end, clamping means engaging said inwardly and rearwardly extending surface for holding said cutting means on said arbor means with its axis substantially parallel to the axis of tubing moved axially relative to said arbor means for trimming the inside bead, and means on said arbor means forming a rigid support for the rearward end of said body.

3. The apparatus of claim 2, said clamping means including means for guiding severed bead from said cutting edge into said axial discharge opening.

4. Apparatus for trimming inside bead from welded tubing, said apparatus comprising arbor means, cutting means including a generally cylindrical body having an axial discharge opening through its center, a surface extending inwardly and rearwardly from the forward outer edge of said body to said opening to form a cutting edge at said forward outer edge, means defining a recess in said arbor means for receiving said cutting means, clamping means for holding said cutting means in said recess with its axis parallel to the axis of tubing moved axially relative to said arbor means and with a portion of said cutting edge projecting from said arbor means to sever the inside bead whereby the severed bead moves downwardly and rearwardly over said surface toward said clamping means, said clamping means defining a guiding surface for directing the severed bead through said axial discharge opening, and means defining an axial passageway along said arbor for the rearward movement of the severed bead away from said axial discharge opening.

5. Apparatus for trimming an inside bead from the seam of welded tubing, said apparatus comprising an arbor, guiding means mounted on said arbor and engageable with the wall of tubing moved axially relative to said arbor for positioning the seam in alignment with and spaced from a portion of the arbor, means defining a recess in said portion of the arbor, a hollow annular cutting tool having a circular cutting edge at its leading end, clamping means for engaging the leading end of said cutting tool to hold the cutting tool in said recess with the cutting tool axis parallel to the tubing axis and with a desired segment of said cutting edge projecting outwardly a distance from said arbor for engaging and severing the inside bead, radially movable adjustment means mounted in said arbor and engaging said cutting tool for adjusting said distance of outward projection, and means defining a recess in said clamping means, said recess and said cutting tool cooperating to form a passageway for the severed bead extending from said projecting segment of said cutting edge to the hollow central portion of said tool.

6. In inside bead trimming apparatus for welded tubing, the combination of an elongated arbor, a cutting tool mounted near one end of said arbor and projecting therefrom, guiding roller means engageable with the tubing wall and spanning the inside bead to hold the inside bead and said cutting tool in alignment, an elongated, rigid tension pad carried by the arbor and having an outer surface slidably engagable with the tubing wall substantially opposite the inside bead, said arbor and tension pad having flat interfacing surfaces of substantial axial extent, and an elongated sheet of resilient compressible material sandwiched between said interfacing surfaces for urging said tension pad and said guiding roller means in opposite directions against the tubing wall, thereby urging the arbor and cutting tool toward the inside bead.

7. The combination of claim 6, said guiding roller means comprising a pair of guide rollers, one located adjacent each end of said tension pad, said cutting tool being spaced along said arbor a substantial distance from said guiding rollers and tension pad.

8. Apparatus for trimming inside bead from welded tubing, said apparatus comprising arbor means, cutting means including a generally cylindrical body having an axial discharge opening through its center, a surface extending inwardly and rearwardly from the forward outer edge of said body to said opening to form a cutting edge at said forward outer edge, means defining a recess in said arbor means for receiving said cutting means, clamping means for holding said cutting means in said recess with a portion of said cutting edge projecting from said arbor means to sever the inside bead whereby the severed bead moves downwardly and rearwardly over said surface toward said clamping means, said clamping means defining a guiding surface for directing the severed bead through said axial discharge opening, and means defining an axial passageway along said arbor for the rearward movement of the severed bead away from said axial discharge opening.

References Cited

UNITED STATES PATENTS

| Re. 20,439 | 7/1937 | Rippel | 90—24 |
| 591,871 | 10/1897 | McCool | 90—24 |
| 2,237,550 | 4/1941 | Darner | 90—24 |
| 3,165,028 | 1/1965 | Keska | 90—24 |

GERALD A. DOST, *Primary Examiner.*